United States Patent [19]
Dingwall et al.

[11] Patent Number: 5,903,752
[45] Date of Patent: May 11, 1999

[54] METHOD AND APPARATUS FOR EMBEDDING A REAL-TIME MULTI-TASKING KERNEL IN A NON-REAL-TIME OPERATING SYSTEM

[75] Inventors: Thomas J. Dingwall; Narasimha Kumar, both of Portland, Oreg.

[73] Assignee: Intel Corporation, Santa Clara, Calif.

[21] Appl. No.: 08/732,924

[22] Filed: Oct. 17, 1996

Related U.S. Application Data

[63] Continuation of application No. 08/350,415, Dec. 6, 1994, abandoned, which is a continuation-in-part of application No. 08/323,044, Oct. 13, 1994, Pat. No. 5,721,922.

[51] Int. Cl.$^6$ ........................................ G06F 9/46
[52] U.S. Cl. ...................... 395/673; 395/672; 395/681
[58] Field of Search .................................. 395/672, 673, 395/674, 650, 670, 857

[56] References Cited

U.S. PATENT DOCUMENTS

| | | | |
|---|---|---|---|
| 4,414,624 | 11/1983 | Summer, Jr. et al. | 364/200 |
| 5,265,251 | 11/1993 | Agarawal | 395/650 |
| 5,305,461 | 4/1994 | Fergenbaum | 395/775 |
| 5,396,597 | 3/1995 | Bodin | 395/275 |
| 5,414,848 | 5/1995 | Sandage | 395/650 |
| 5,436,974 | 7/1994 | Kovanen | 380/51 |
| 5,442,789 | 8/1995 | Baker et al. | 395/650 |
| 5,459,869 | 10/1995 | Spilo | 395/700 |
| 5,477,242 | 12/1995 | Thompson | 345/132 |
| 5,530,858 | 6/1996 | Stanley et al. | 395/650 |
| 5,625,845 | 4/1997 | Allran et al. | 395/857 |
| 5,630,132 | 5/1997 | Allran et al. | 395/670 |

OTHER PUBLICATIONS

"Wingate's client/server framework minimizes recording" by Walter Oney. Dr. Dobb's Journal Mar. 1994, vol. 19, No. 3 pp. 82, 1084–1085, 88–94. 98.

Ferrari, Alberto, : REal–Time Scheduling Algorithms, Dr. Dobb's Journal on CD–ROM; Dec. 1994.

Krause, Reinhardt, Intel plans DSP end run; Electronic News, v40, n2036, p1(2), Oct. 17, 1994.

Tomlinson, Paula; Virtualizing a DOS device driver with a V+D; Windows–DOS Developer's Journal; v5, n5, p6(14), May 1994.

Gibson, Ken; A C++ multitasking class library; preeemptive multitasking under DOS; v19, n5, p28(7), May 1994.

Green, James; The evolution of DVI system software; Communications of the ACM; v35, n1, p52(16), Jan. 1992.

*Primary Examiner*—Alvin E. Oberley
*Assistant Examiner*—Patricia Caldwell
*Attorney, Agent, or Firm*—Blakely, Sokoloff, Taylor & Zafman LLP

[57] ABSTRACT

An improved method and apparatus for embedding a real-time multi-tasking kernel in a non-real-time operating system is disclosed. Through encapsulating a real-time kernel into the interrupt handling environment of a non-real-time operating system, such as Windows®, the method of the present invention allows for an entire real-time environment to be supported within the operating system. The scheduler of the real-time kernel supports multiple threads of execution all running at higher priority than the application tasks. By using synchronization mechanisms of the operating system, e.g. VxD events in enhanced mode Windows®, the real-time tasks are able to make use of system services of the operating system. Real-time tasks not requiring system services execute more quickly from interrupt mode. Real-time tasks requiring system services execute partially from interrupt mode and partially from event mode.

14 Claims, 7 Drawing Sheets

METHOD AND APPARATUS FOR EMBEDDING A REAL-TIME MULTI-TASKING KERNEL IN A NON-REAL-TIME OPERATING SYSTEM

This is a continuation of Ser. No. 08/350,415 which was filed Dec. 6, 1994, now abandoned which is a continuation-in-part of Ser. No. 08/323,044 filed Oct. 13, 1994, now U.S. Pat. No. 5,721,922.

BACKGROUND OF THE INVENTION

FIELD OF THE INVENTION

The present invention relates to the field of real-time multi-tasking. More particularly, the present invention relates to an improved method and apparatus for embedding a real-time multi-tasking kernel in a non-real-time operating system.

BACKGROUND OF THE INVENTION

Video conferencing and personal computer (PC) applications which deal with communications and natural data types, i.e., audio and video data, require real-time interrupt handling and task scheduling. The user will hear clicks and pops from audio data output and see modulating or jerky video output, if there is a delay in the capture or playback of audio or video data. Furthermore, playback of audio and video data must be synchronized with each other to appear natural.

FIG. 1 illustrates the real-time processing of natural data types. Natural data types require real-time response for presentation and capture. The audio and video data must be transmitted to and from external output devices in a timely manner. In step 10, data from an audio/video file on disk is read to a memory buffer. The memory buffer is then transferred to a playback device by an interrupt service routine in step 12, in response to hardware interrupts by the playback device.

In step 14, the interrupt service routine signals the task to refill the memory buffer, as data in the memory are transferred to the playback device. In step 16, the task reads more data from the audio/video file on disk. If there is excessive delay in the data transfer from the memory buffer to the playback device or from disk to the memory buffer, a noticeable click or a pop in the playback of the audio/video data is produced. Such delay is called interrupt and/or a task latency. Interrupt latency is the delay between a hardware interrupt signal and the execution of the first instruction of an interrupt handler. Task latency is the delay between a highest priority task becoming ready for execution and actually beginning execution.

In many graphic user interface environments, e.g. Windows® (Windows® is a registered trademark of Microsoft Corporation of Redmond, Wash.), if audio or video playback alone is being executed, a system processing the natural data types will produce a smooth playback output. However, other operations being performed on a system processing the natural data types, such as spreadsheet and networking activities, as well as transmission of electronic mail (E-mail), can disrupt the scheduling of the audio and video playback. Such disruptions may cause the audio and video playback to manifest pops, clicks and/or jerky video output. In addition, playback of both audio as well as video data may produce an unnatural output due to lack of synchronization of the natural data types.

It is desirable to have a method and apparatus for allowing real-time programming with support for the presentation of natural data types, without allowing other operations to disrupt the delivery and playback of the audio and video data.

The above referenced patent application describes a method and apparatus for embedding a real-time multi-tasking kernel into a non-real-time operating system. In the described embodiment, all tasks under the real-time kernel run at virtual machine manager (VMM) event time. Whenever an interrupt handler wakes up a blocked task, actual execution of the task is delayed until the VMM schedules an event. The task then executes at VMM event time.

The embodiment described in the above-referenced patent application may experience unnecessary delays in the execution of real-time tasks in some circumstances. Because real-time tasks are always delayed until VMM event time, a certain level of real-time response is comprised. It may not always be necessary to delay real-time tasks in this manner.

Thus, an improved method and apparatus for embedding a real-time tasking kernel into a non-real-time operating system is needed.

SUMMARY OF THE INVENTION

The present invention provides an improved method and apparatus for embedding a real-time multi-tasking kernel into a non-real-time operating system. Through encapsulating a real-time kernel into the interrupt handling environment of a non-real-time graphical user interface, such as Windows®, the method of the present invention allows for an entire real-time environment to be supported within the graphical user interface. The scheduler of the real-time kernel supports multiple threads of execution all running at higher priority than the graphical user interface tasks. By using synchronization mechanisms of the graphical user interface, e.g. VxD events in enhanced mode Windows®, the real-time tasks are able to make use of system services of the graphical user interface.

The method and apparatus of the present invention allows real-time programming with support for the presentation of natural data types, without allowing other operations to disrupt the delivery and playback of the audio and video data. The method and apparatus of the present invention is also applicable in communications.

The present invention further provides a method and apparatus for executing real-time tasks at interrupt time rather than always delaying execution to event time. In the preferred embodiment, real-time tasks are executed as soon as a signaling interrupt handler completes, rather than waiting for an event to be scheduled. This embodiment improves real-time response. In situations where real-time tasks must use VxD services, the present invention provides a method and apparatus for ensuring that the execution environment is safe for VxD service execution.

The advantages of the present invention will become apparent as illustrated in the figures and described in the following detailed description of the preferred embodiment.

DETAILED DESCRIPTION OF THE INVENTION

An improved method and apparatus for embedding a real-time multi-tasking kernel in a non-real-time operating system is disclosed. The present invention utilizes the VxD environment in Windows® to provide real-time interrupt handling and task scheduling for personal computer applications dealing with communications and natural data types.

Figure 1:
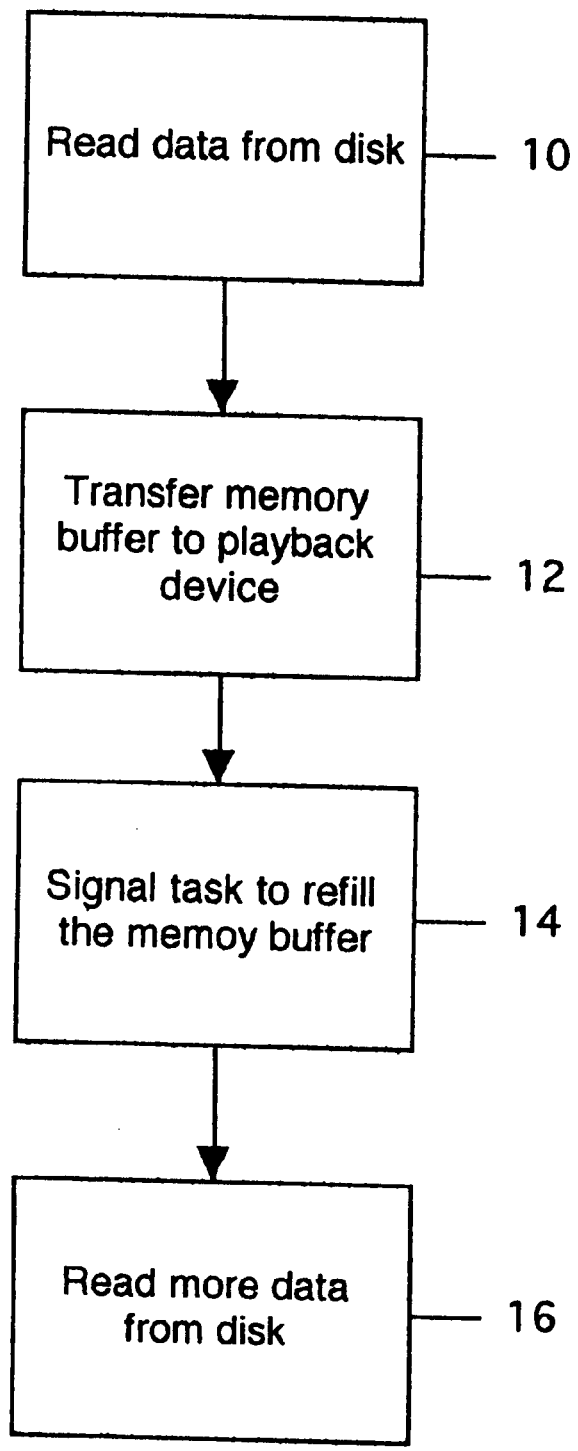
FIG. 1 illustrates real-time processing of natural data types.
Figure 2:
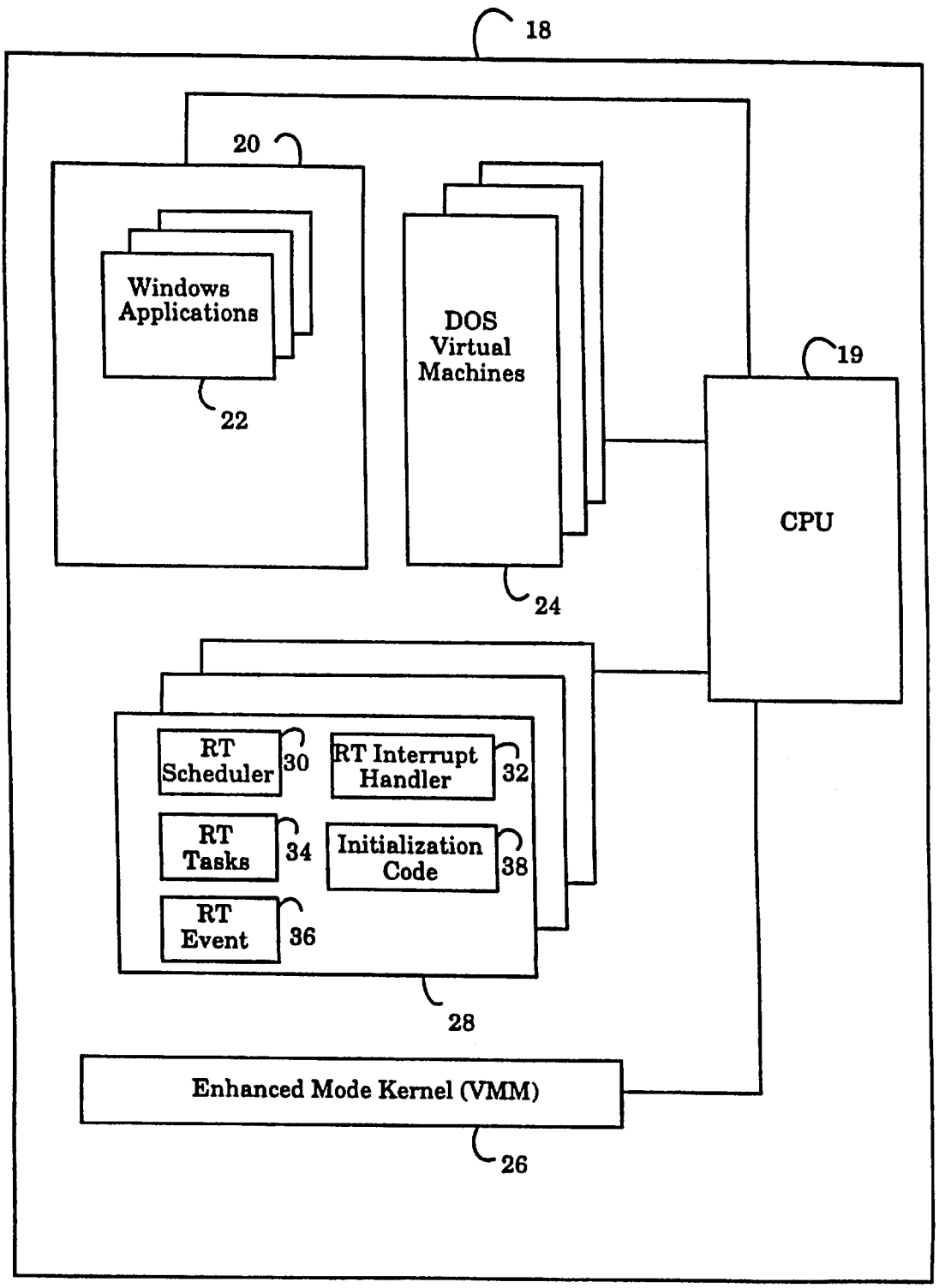
FIG. 2 programming environments in Windows®.

FIG. 2 illustrates a Windows® VxD programming environment as a preferred embodiment of the present invention. CPU 19 of computer 18 controls the operations of: system virtual machine 20, a set of DOS virtual machines 24, virtual machine manager (VMM) 26, and a set of virtual device drivers (VxDs) 28. Windows® applications 22, including dynamic link libraries execute in system virtual machine 20. In the system virtual machine environment, applications are scheduled in a cooperative multi-tasking manner. Because of the cooperative nature of the scheduling mechanism, real-time response cannot be guaranteed for any given application.

In contrast, DOS virtual machines 24, and system virtual machine 20 in it's entirety, are scheduled preemptively by enhanced mode VMM 26. Although the scheduling of virtual machines is preemptive, VMM 26 emphasizes user responsiveness, rather than the real-time response requirements of particular virtual machines. As a result, the DOS virtual machine environment 24 does not provide satisfactory real-time response for natural data type processing, although it does provide better response than the cooperative environment in which Windows® applications are scheduled.

The virtual device driver (VxD) environment of Windows®, supported by VMM 26, provides sufficient interrupt response for communications and natural data type processing. VxDs are thirty-two bit dynamic link libraries running at the most privileged level (ring 0) of CPU 19. The VxD environment, however, is totally interrupt-driven. There is no notion of tasks or task scheduling in this environment. Because of this, the standard VxD environment is very difficult to use for communications or natural data type processing. The present invention presents a method for embedding a real-time scheduler into a VxD, in order to provide real-time multi-tasking for communication and natural data type applications.

The method of the present invention for supporting real-time multi-tasking consists of VxD 28, containing real-time scheduler (RT scheduler) 30, application specific interrupt handlers 32, real-time tasks (RT Tasks) 34, event 36, and VxD initialization code 38. One of the real-time tasks, referred to as an idle task, is dedicated to context switching between Windows® and real-time VxD, and has the lowest priority of any task scheduled by real-time scheduler 30.

A real-time scheduler 30 for use in the present invention has three capabilities. First, it is capable of scheduling tasks preemptively by priority. Secondly, the real-time scheduler 30 allows interrupt handlers 32 to make real-time tasks 34 ready for execution without preemption occurring (i.e., it supports a scheduling lock). Thirdly, the real-time scheduler 30 allows the scheduling lock to be released causing any high priority, ready real-time tasks to prempt the current process.

Initialization of this environment proceeds as follows: VxD initialization code 38 is invoked by VMM 26 during system initialization. This initialization code 38 invokes the initialization entry point of RT scheduler 30. In response, RT scheduler 30 creates an idle task and associates the context of the calling thread with the idle task. RT scheduler 30 then returns to VxD initialization code 38. At this point there is a single task, the idle task, within the real-time environment.

Initialization code 38 may then create other, application-specific tasks. For example, initialization code 38 may create a task to perform capture or playback of audio/video. Because such application-specific tasks are higher priority than the idle task, scheduler 30 will prempt the idle task in order to execute another task as soon as it is created. Each application-specific task performs initialization of its application when it starts. The example task might initialize its audio/video device, including installing RT interrupt handler 32, to service the device. The example task might also install another RT interrupt handler to service software interrupts, generated by Windows® applications wishing to communicate with the application-specific task. Eventually, each application specific task will complete initialization, and block. For instance, the example application would block waiting for the audio/video device to complete an operation or for a Windows® application to communicate with the task. When all application-specific tasks complete execution and block, the idle task will again be executed. The idle task executes VxD initialization code 38, which then returns to VMM 26. At this point the entire real-time environment 28, including all its tasks has initialized. VMM 26 may now complete initialization of the rest of the system, allowing the computer to begin normal operation.

Figure 3:
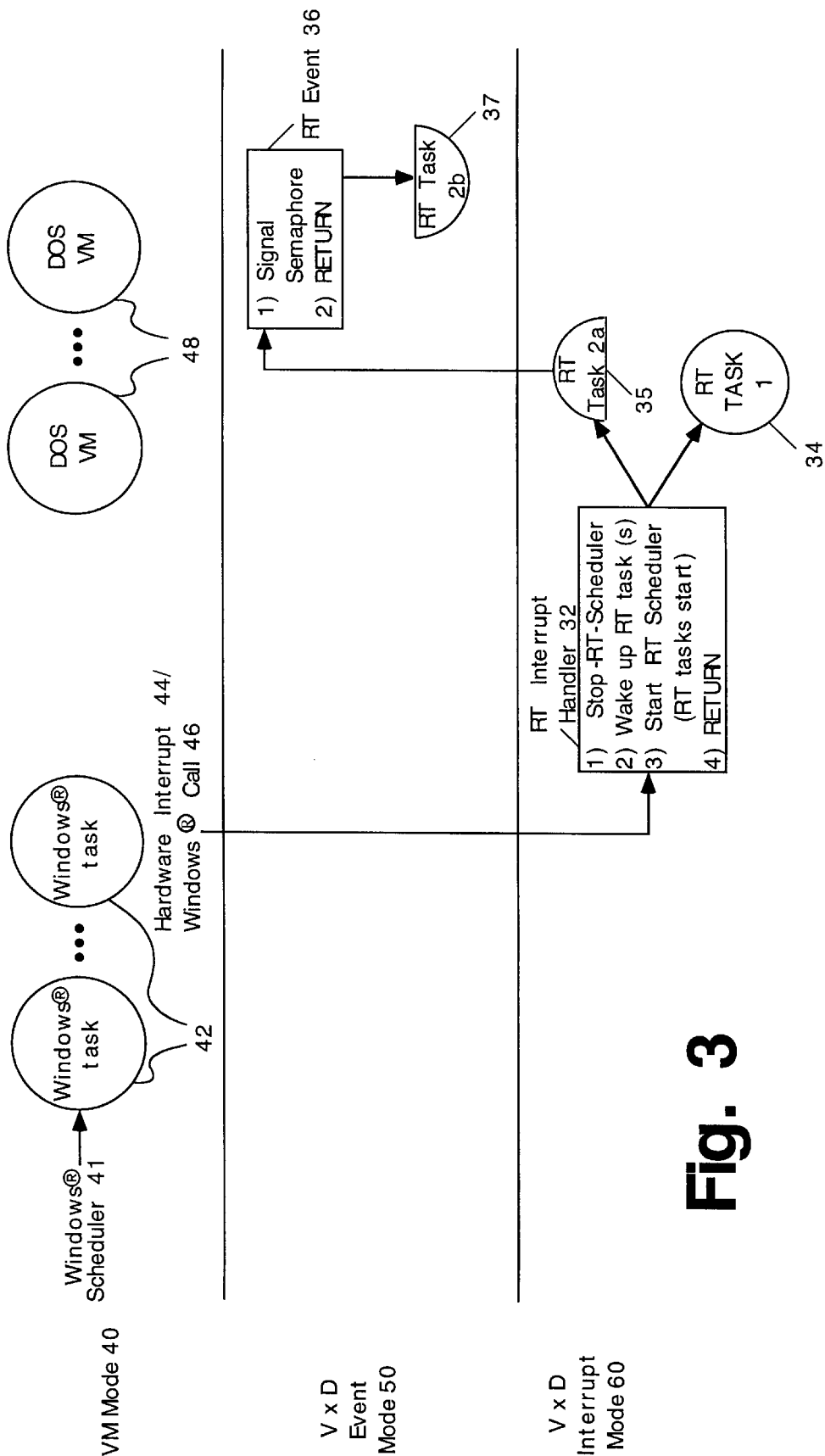
FIG. 3 illustrates real-time interrupt handling and task scheduling in a VxD environment.

FIG. 3 illustrates the sequence of events for the present invention during normal system operation. References will be made to elements described in FIG. 2. Virtual Machine (VM) mode 40 represents the phase of system operation when virtual machines are executing. VM mode 40 includes the execution of both DOS virtual machines 24 and system virtual machine 22, in which Windows® applications execute. VxD event mode 50 represents the phase of system operation when the VMM 26 executes events. In particular, VxD event mode 50 represents the time when RT event 36 is executing. VxD interrupt mode 60 represents the phase of system operation when VMM 26 or VxD interrupt handlers are executing. In particular, interrupt mode 60 represents the time when RT interrupt handlers 32 are executing.

Normally, the system will be executing within a virtual machine, either a DOS VM or the system virtual machine. VMM 26 schedules virtual machines, and the Windows® kernel schedules Windows® applications within the system VM, all without any knowledge of RT scheduler 30. RT scheduler 30 remains inactive, with its state indicating that the idle task is running and all other RT tasks 34 and 35 are asleep.

At some point, an interrupt occurs which causes the processor to switch to VxD interrupt mode 60 and execute RT interrupt handler 32. For the example application it is assumed that the hardware interrupt handler servicing the audio/video device is invoked. (Operation is identical for the case of a software interrupt from a Windows® application.) As part of servicing the interrupt, RT interrupt handler 32 may need to wake up its associated real-time task. For example, the audio/video device may have completed filling a buffer with data which the task needs to process.

As shown in FIG. 3, RT interrupt handler 32, once activated by a hardware interrupt, stops RT scheduler 30 to prevent RT scheduler 30 from switching tasks while the real-time interrupt is being handled. RT interrupt handler 32 wakes up the RT task associated with the hardware interrupt. RT interrupt handler 32 then starts RT scheduler 30. As a result, the previously awakened RT task starts execution.

FIG. 3 illustrates two basic types of RT tasks supported by the present invention. The first type of RT task 34 represents an RT task which does not require calls to VM services as part of the RT task execution. Because these types of RT tasks do not employ VM services, there is no danger in executing these types of tasks solely in interrupt mode 60 as shown in FIG. 3. Thus, once RT interrupt handler 32 starts RT scheduler 30, RT task 34 immediately begins execution and continues execution to completion in interrupt mode 60. Once completed, RT task 34 returns, RT interrupt handler 32 returns, and servicing for the hardware interrupt is complete.

The second type of RT task supported by the present invention is illustrated in FIG. 3 as RT task portion 35 and RT task portion 37. RT task portion 35 and RT task portion 37 together represent an RT task 2 which requires the use of VM services as part of RT task execution. As well known to those of ordinary skill in the art, it is not safe to execute a VM call from interrupt mode 60. VM calls may fail if recursively called from interrupt mode 60. For this reason, it is necessary to be in event mode 50 when the VM service call is executed. In the present invention, therefore, the RT task 2 is split into an interrupt mode processing portion 35 and an event mode processing portion 37 as illustrated in FIG. 3.

When RT interrupt handler 32 starts RT scheduler 30, RT task portion 35 immediately begins execution in interrupt mode 60. Any portion of RT task 2 not requiring VM service calls may be executed in RT task portion 35 in interrupt mode. When it is necessary to execute a VM call, RT task portion 35 schedules execution of RT event 36 with the virtual machine manager. RT task portion 35 then blocks on a semaphore and waits for the execution of RT event 36. After a small delay, RT event 36 begins execution in event mode 50. RT event 36 signals the semaphore and returns thereby enabling RT task portion 37 to continue execution in event mode 50. Because the execution environment for RT task 2 has been made safe by the execution of RT event 36, RT task portion 37 may now execute a VM service call in event mode 50. RT task portion 37 may execute one or more VM calls. Other event mode processing for RT task 2 may be performed by RT task portion 37. Upon completion, RT task portion 37 returns thereby completing processing for the hardware interrupt.

Figure 4:
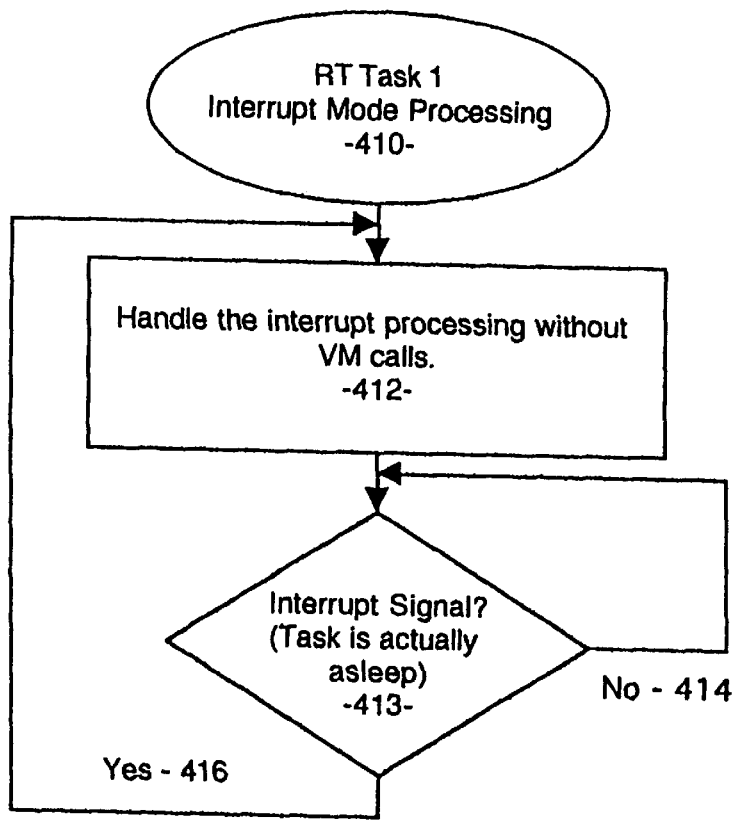
FIGS. 4–8 are flowcharts illustrating the processing flow of the preferred embodiment.

Referring now to FIG. 4, the processing logic for RT task 1 begins a bubble 410. This processing logic corresponds to RT task 34 illustrated in FIG. 3. Because RT task 1 does not perform VM calls, the hardware interrupt is handled completely in interrupt mode in processing block 412. Once the interrupt is handled, the RT 1 interrupt mode task goes to sleep at decision block 413 waiting for the next interrupt signal to occur.

Figure 5:
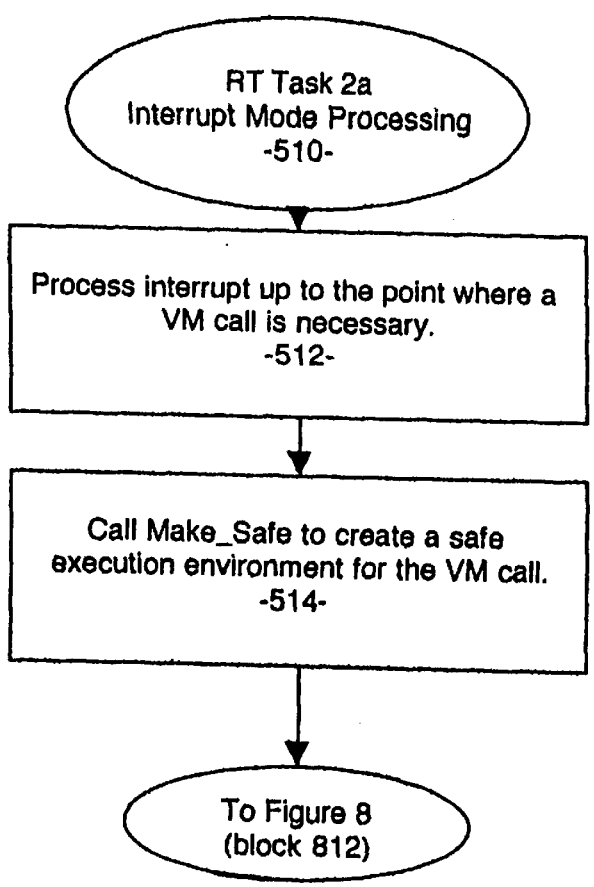

FIGS. 5–8 illustrate the processing logic for an RT task that requires VM calls during RT task execution. Such an RT task is represented in FIG. 3 as RT task 2 comprising RT task portion 35 and RT task portion 37. RT task portion 35 processing logic is illustrated in FIG. 5.

Referring now to FIG. 5, RT task portion 35 processing logic in interrupt mode is shown starting at bubble 510. RT task interrupt mode processing continues until a VM call is necessary as part of RT task execution (processing block 512). Because it is not safe to execute the VM call from interrupt mode, separate processing is required to perform the VM call from the event mode execution environment. In the preferred embodiment, a procedure called Make_Safe is called to create a safe execution environment for the VM call (processing block 514). The processing logic for the Make_Safe procedure is illustrated in FIG. 6.

Figure 6:
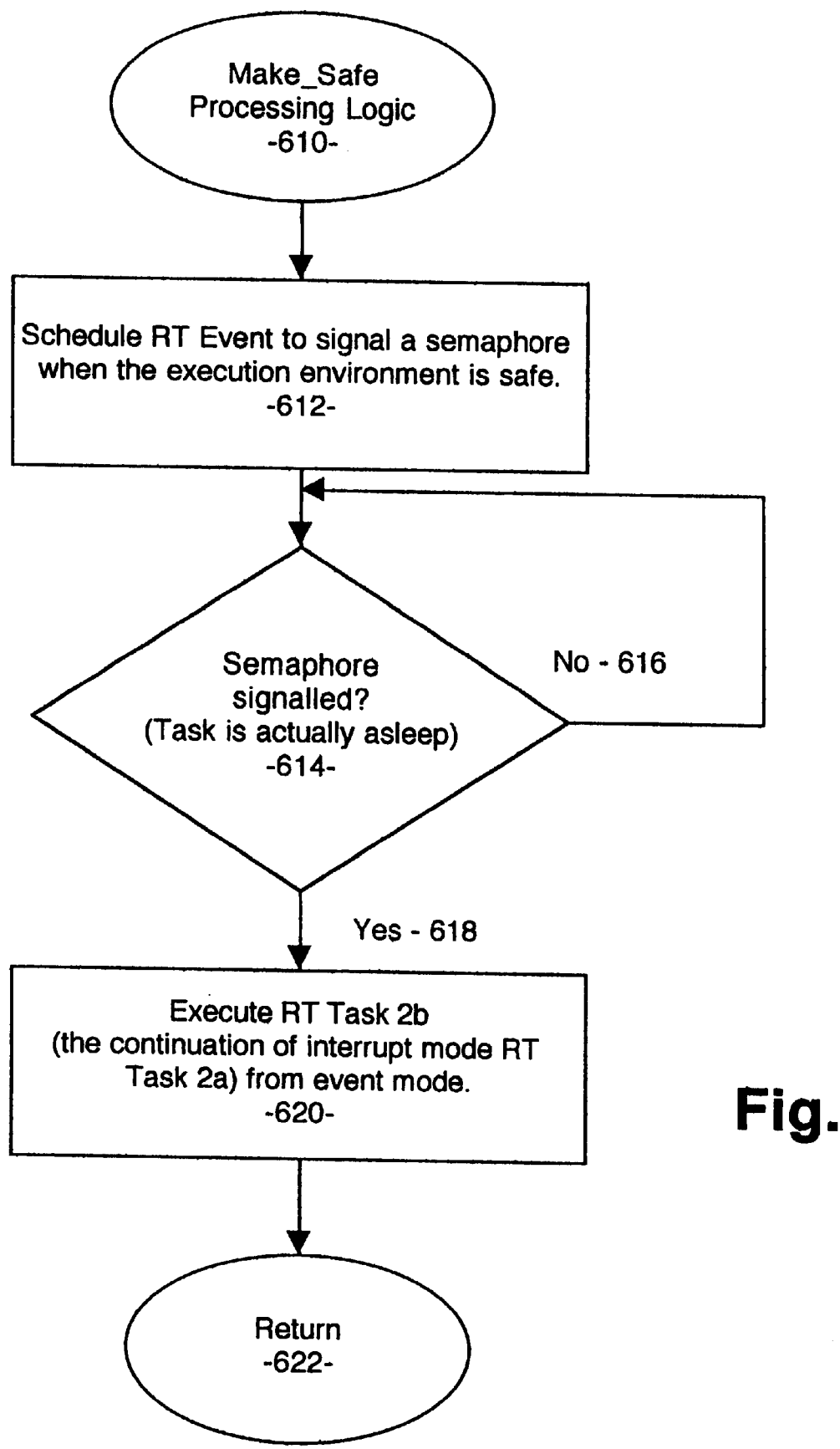

Referring now to FIG. 6, processing logic for the Make_Safe procedure is illustrated starting at bubble 610. The Make_Safe procedure first schedules RT event 36 to signal a semaphore when the execution environment is safe (processing block 612). The processing logic for the RT event is illustrated in FIG. 7.

Figure 7:
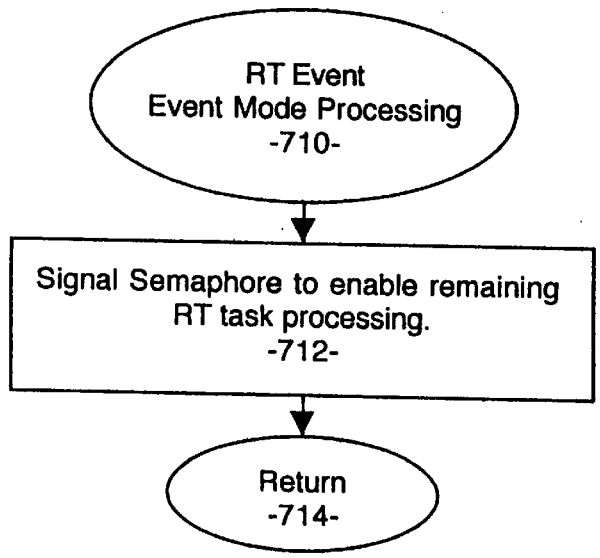

Referring now to FIG. 7, RT event processing is shown starting at bubble 710. Because the RT event 36 is scheduled with the virtual machine manager, the RT event executes in event mode 50. Once VMM 26 activates RT event 36, no recursive call problems exist and the execution environment for the RT task is safe. Thus, RT event 36 simply signals a semaphore in processing block 712 to enable the remaining portion 37 of RT task 2. RT event mode processing then returns through bubble 714 illustrated in FIG. 7.

Referring again to FIG. 6, Make_Safe processing waits for the completion of RT event 36 by waiting for the semaphore to be signaled in decision block 614. Once this occurs, processing path 618 is taken to processing block 620. In this case, the RT task portion 37 is executed from event mode. Until the semaphore is signalled (decision block 614), the RT task is actually asleep in a dormant mode. No polling of the semaphore is necessary.

Figure 8:
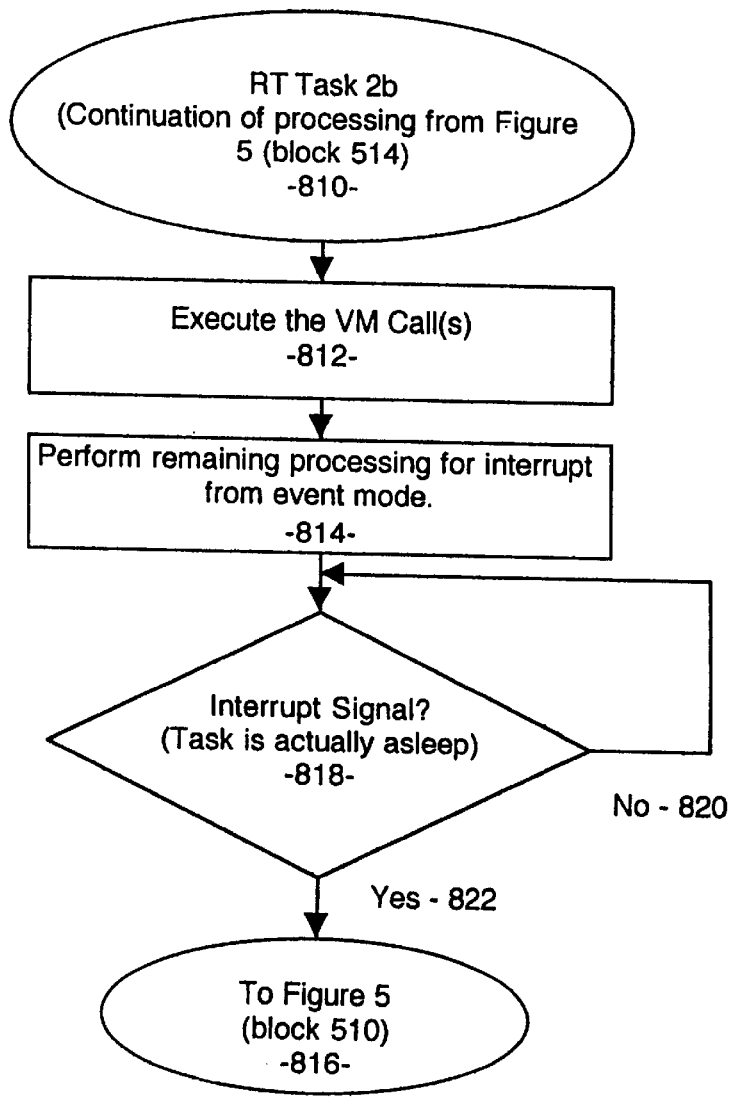

Referring now to FIG. 8, processing logic for the RT task portion 37 is illustrated starting at bubble 810. This processing logic is a continuation from block 514 illustrated in FIG. 5. The RT task portion 37 executes from event mode. Because it has been previously determined that the execution environment is safe, a VM call (or calls) is executed in processing block 812. Other portions of the processing for the RT task are performed in event mode in processing block 814. Once the event mode processing for the interrupt is complete, the RT task goes to sleep in decision block 818 waiting for the next interrupt. When the interrupt occurs (processing path 822), the process starts over again at bubble 510 shown in FIG. 5 and described below.

Figure 9:
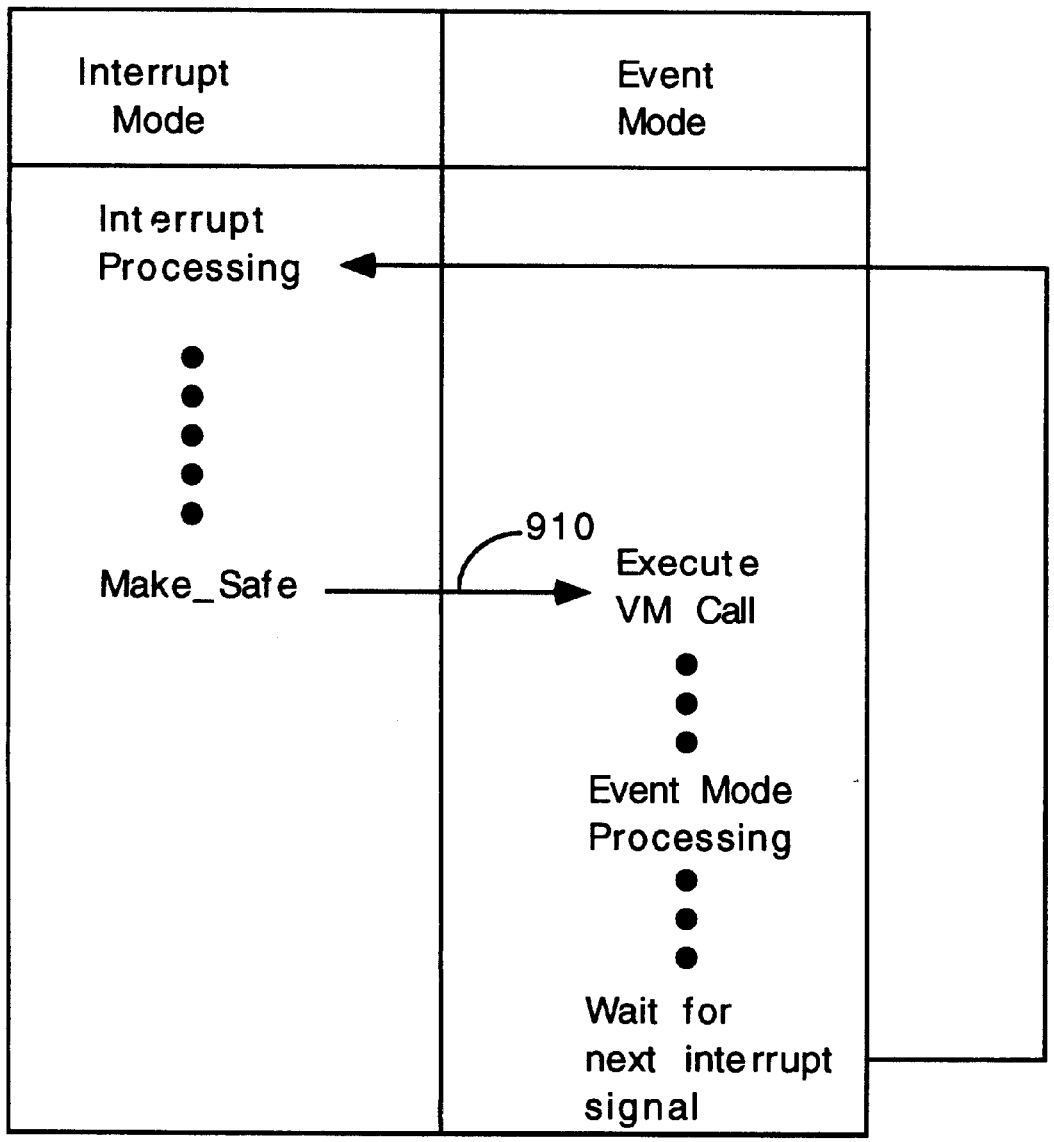
FIG. 9 illustrates the execution modes of an RT task.

Referring now to FIG. 9, the RT task execution environments are illustrated. For an RT task requiring use of VM service calls, the RT task comprises an interrupt mode environment and an event mode environment. The interrupt mode environment is initially entered through RT interrupt handler 32. When it is necessary to execute a VM call, an RT event is scheduled by Make_Safe through the virtual machine manager. Once this RT event begins execution, the event mode environment of the RT task is entered by means of the semaphore signalled by Make_Safe as shown by arrow 910 illustrated in FIG. 9. From event mode, the VM call is executed along with any additional event mode processing required by the RT task. The RT task then blocks waiting for another interrupt signal.

RT tasks will perform whatever processing is appropriate for a particular interrupt. In the example, RT task 34, 35, or 37 would process the audio/video data captured by the audio/video device. As part of its execution, RT tasks may awaken other RT tasks causing them to execute in turn. Eventually, all RT tasks complete their processing, and block waiting for another signal to trigger their execution. At this point, the idle task regains control. The idle task returns the system to VM mode 40 to resume normal system operation.

This completes the cycle. Windows® schedulers 41 are back in control, all RT tasks are blocked, and RT scheduler 30 believes the idle task is executing. Another interrupt starts the cycle all over again. It is clear that the implementation detail is readily apparent to one skilled in the art based upon the detailed and operational description herein.

An important property of the present invention is that RT tasks execute with less delays in primarily the interrupt mode. In some circumstances (i.e. when VM services are not required), the RT task executes very quickly from purely the interrupt mode. In other circumstances when VM services are required, the RT task can execute partially in interrupt mode and partially in VxD event mode. Because event mode has precedence over all Windows® applications and DOS virtual machines, RT tasks are free of the scheduling problems caused by them. On the other hand, RT tasks executing in event mode are free to take advantage of all services provided by the VMM. Thus, RT tasks in this invention execute with less delay in the interrupt mode; yet, they are not subject to the substantial restrictions placed on VxD interrupt mode. In effect, the present invention improves real-time response by delaying the scheduling of events until necessary. In the invention of the above-referenced co-pending patent application, the invention always scheduled an event before a real-time task executed. The present invention schedules an event only when it is needed to safely use a VxD service. It should be noted, however, that the preferred embodiment does not support time slicing schedulers or functions which dynamically re-arrange task priorities.

What has been described is an improved method and apparatus for embedding a real-time multi-tasking kernel in a non-real-time operating system. Through use of the VxD programming environment, the present invention supports real time scheduling of real-time tasks involving the processing of communications and natural data types.

While certain exemplary embodiments have been described in detail and shown in the accompanying drawings, it is to be understood that such embodiments are merely illustrative of and not restrictive on the broad invention, and that this invention not be limited to the specific arrangements and constructions shown and described, since various other modifications may occur to those of ordinary skill in the art.

What is claimed is:

1. A method for using events in a non-real time operating system to support real-time programming, said method comprising the steps of:

running real-time tasks in a VxD environment;

using VxD events within the non-real time operating system to make VxD services available for use by said real-time tasks;

embedding a real-time scheduler in said VxD environment;

enabling multi-tasking using said real-time scheduler in said VxD environment, said real-time scheduler scheduling said real-time events to execute when needed; and executing real-time tasks partially in an interrupt mode and partially in an event mode, based on when said real-time tasks are needed.

2. The method of claim 1 further comprising the step of:

creating real-time tasks to handle communication or natural data types captured or processed for a playback.

3. The method of claim 1 further comprising the step of causing a processor to switch from executing in a virtual machine to executing in a VxD interrupt mode, said step performed by a virtual machine manager.

4. The method of claim 3 further comprising the step of performing a hardware interrupt to indicate an audio/video capture.

5. The method of claim 3 further comprising the step of performing an application call to indicate an audio/video playback.

6. The method of claim 3 further comprising the steps of:

entering said VxD environment;

executing a real-time interrupt handler in said VxD environment in said VxD interrupt mode;

entering VxD event mode and executing said VxD event; and returning to said virtual machine manager and resuming normal operation in said virtual machine.

7. A system for using events in a non-real time operating system to support real-time programming, said system comprising:

a processor executing real-time tasks in a VxD environment;

a real-time scheduler embedded in a VxD environment, said real-time scheduler enabling multi-tasking and using VxD events within the non-real time operating system to make VxD services available for use by said real-time tasks, said real-time scheduler also scheduling said real-time events to execute when needed; and means for executing said real-time tasks partially in an interrupt mode and partially in an event mode, based on when said real-time tasks are needed.

8. The system of claim 7 further comprising:

real-time tasks to handle communication or natural data types captured or processed for a playback.

9. The system of claim 7 further comprising a virtual machine manager for causing a processor to switch from executing in a virtual machine to executing in a VxD interrupt mode.

10. The system of claim 9 further comprising a hardware interrupt to indicate an audio/video capture.

11. The system of claim 9 further comprising means for performing an application call to indicate an audio/video playback.

12. The system of claim 9 further comprising:

means for entering said VxD environment;

a real-time interrupt handler executing in said VxD environment in said VxD interrupt mode;

means for entering VxD event mode and executing said VxD event; and means for returning to said virtual machine manager and resuming normal operation in said virtual machine.

13. A method for using events in a non-real time operating system to support real-time programming comprising:

receiving a hardware interrupt related to a real-time task in virtual machine mode;

executing a real-time interrupt handler in an interrupt mode of a VxD environment to process the interrupt;

determining whether the interrupt requires virtual machine services;

processing interrupt handling tasks that do not require the virtual machine services in the interrupt mode of the VxD environment; and processing interrupt handling tasks that require the virtual machine services in an event mode of the VxD environment with a virtual machine manager.

14. The method of claim 13, further comprising:

returning to the interrupt mode of the VxD environment; and returning to the virtual machine mode.

* * * * *